No. 711,000. Patented Oct. 14, 1902.
J. W. & B. C. READ.
DISH CLEANER.
(Application filed June 14, 1902.)
(No Model.) 2 Sheets—Sheet 1.
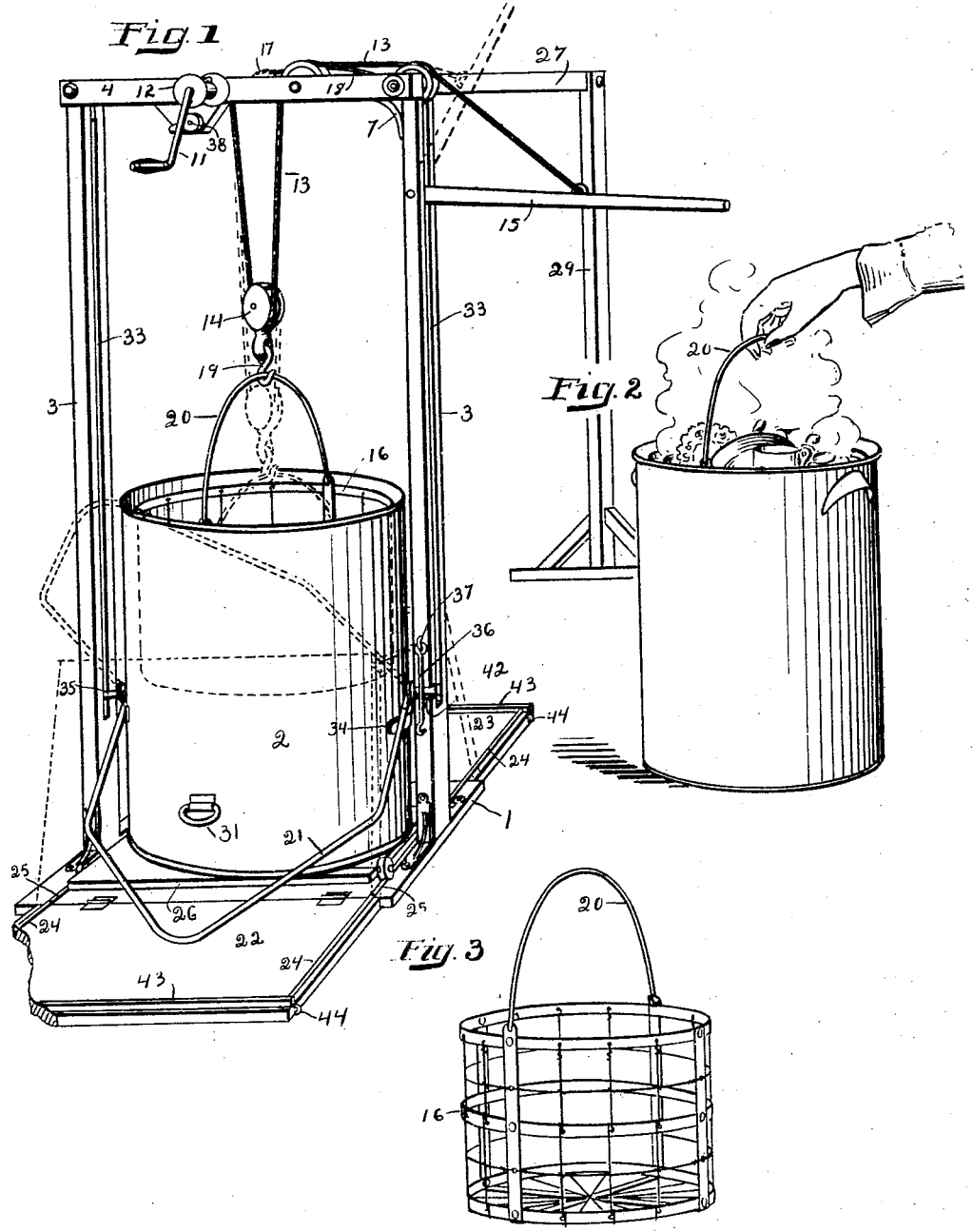
Witnesses
W. H. Stough
J. R. Bond
Inventors
James W. Read
Barton C. Read
By F. W. Bond
Att'y.

No. 711,000. Patented Oct. 14, 1902.
J. W. & B. C. READ.
DISH CLEANER.
(Application filed June 14, 1902.)
(No Model.) 2 Sheets—Sheet 2.
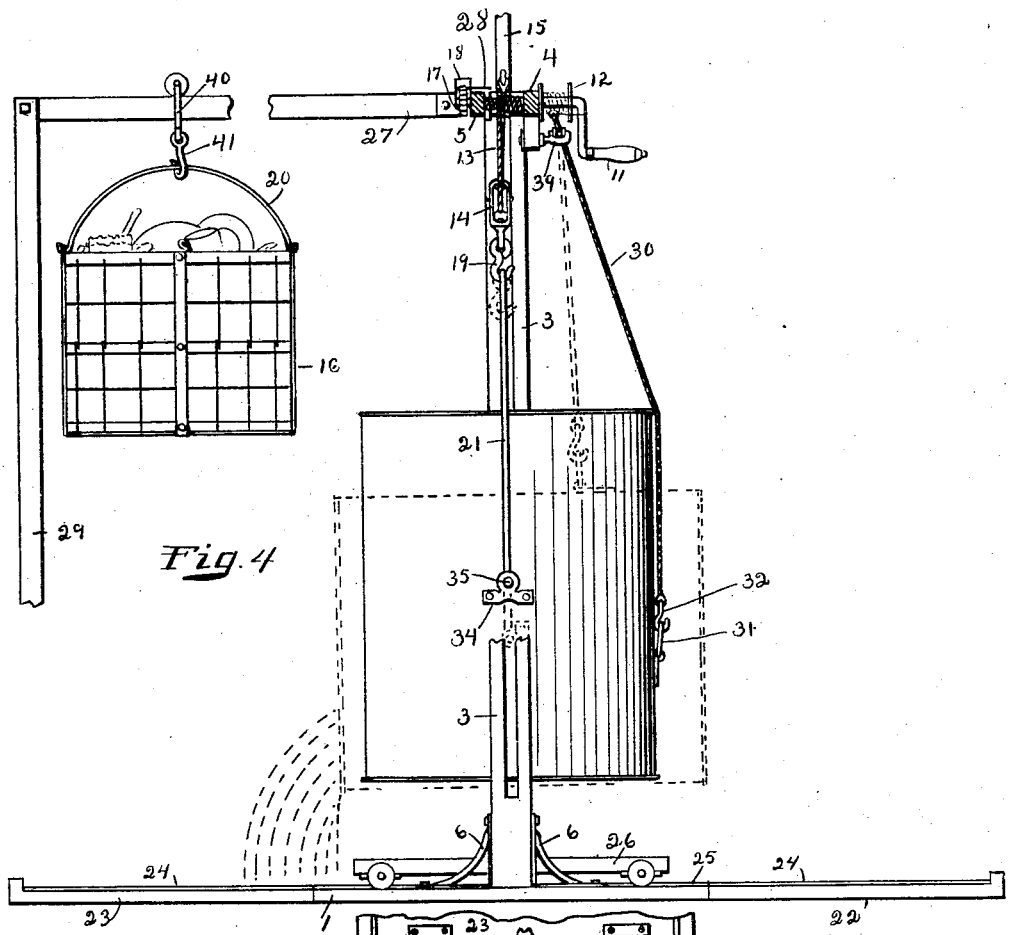
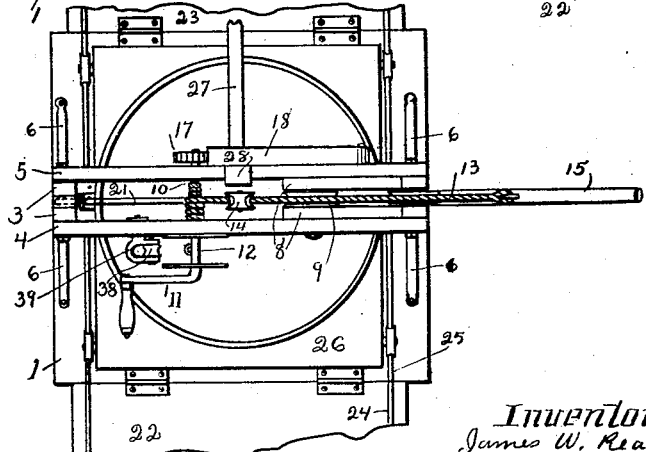
Witnesses
W. H. Stough
J. R. Bond
Inventors
James W. Read
Barton C. Read
By J. W. Bond
Att'y.

UNITED STATES PATENT OFFICE.

JAMES W. READ AND BERTON C. READ, OF WOOSTER, OHIO.

DISH-CLEANER.

SPECIFICATION forming part of Letters Patent No. 711,000, dated October 14, 1902.

Application filed June 14, 1902. Serial No. 111,696. (No model.)

*To all whom it may concern:*

Be it known that we, JAMES W. READ and BERTON C. READ, citizens of the United States, residing at Wooster, in the county of Wayne and State of Ohio, have invented certain new and useful Improvements in Dish-Cleaners; and we do hereby declare that the following is a full, clear, and exact description of the same, reference being had to the annexed drawings, making a part of this specification, and to the figures of reference marked thereon, in which—

Figure 1 is a perspective view. Fig. 2 is a view showing a small tank. Fig. 3 is a view of the cage designed to contain the dishes. Fig. 4 is a side elevation showing parts in section. Fig. 5 is a top view.

The present invention has relation to dish-cleaners; and it consists in the different parts and combination of parts hereinafter described, and particularly pointed out in the claims.

Similar numerals of reference indicate corresponding parts in all the figures of the drawings.

In the accompanying drawings, 1 represents the base, which is formed of a size to correspond substantially with the size of the tank 2. To the base 1 are attached the uprights 3, which uprights are held in proper parallel position by means of suitable cross or tie bars 4 and 5, and for the purpose of properly bracing the structure the corner-braces 6 and 7 are provided, which braces are attached in any convenient and well-known manner. To the tie-bars 4 and 5 is attached the bar 8 upon which bar is loosely mounted the grooved roller 9, or if desired the groove-pulley 9 may be securely attached to the bar 8, and the bar or what then would be a shaft rotate in suitable bearings attached to the cross or tie bars 4 and 5. It will be understood that it is immaterial, so far as the object hereinafter described, as to whether or not the shaft rotates with the roller or the roller rotates upon a fixed bar. The shaft 10 is properly journaled in the cross or tie bars 4 and 5, which shaft is provided with the crank 11 and the spool 12.

To the shaft 10 is connected one end of the operating-rope 13, which operating-rope extends downward and through the pulley block or head 14, thence upward and over the grooved roller 9, and is connected to the operating-lever 15, which operating-lever is pivotally attached to one of the uprights 3, substantially as illustrated in Fig. 1.

Within the tank 2 is normally located the cage 16, which cage is for the purpose of receiving and holding the dishes designed to be cleaned.

For the purpose of preventing the shaft 10 from rotating by the downpull of the operating-rope 13 it is provided with the ratchet-wheel 17, which is engaged by a suitable detent or dog 18.

It will be understood that by rotating the shaft 10 in one direction the elevating-rope 13 will be wound upon said shaft, which in turn will elevate the cage 16 or the tank 2, reference being had to whichever bail is connected to the hook 19.

The cage 16 is provided with the bail 20, and the tank 2 is provided with the bail 21, and of course when the bail 20 is attached to the hook 19 the cage 16 will be elevated by the winding of the rope, and when the bail 21 is connected to the hook 19 the tank will be elevated.

In use the dishes designed to be cleaned are placed in the cage 16 and the cage lowered into the tank 2, which tank contains the water designed to be used in cleaning the dishes, and for the purpose of moving the cage up and down, carrying with it the dishes through the water contained in the tank, the lever 15 is moved back and forth upon its pivotal point, thereby lowering and elevating the cage. It will be understood that inasmuch as the operating-rope 13 passes under a pulley in the pulley-block 14 an easy movement will be imparted to the cage by means of the lever 15. After the dishes contained in the cage have been thoroughly cleaned the cage can be lifted from the tank by rotating the shaft 10 by means of the handle 11.

To the sides of the base 1 are hinged the extensions 22 and 23, which extensions are provided with the track-rails 24, and the base 1 provided with the track-rails 25, which track-rails 24 and 25 constitute a track for the truck 26 to move back and forth upon.

In use two tanks may be employed and two trucks, and after the cage has been elevated the one containing the water in which the dishes were washed can be moved onto one of the hinged extensions and the other tank and its truck moved onto the base 1 and brought directly under the cage, which tank contains clean water for the purpose of rinsing the dishes, the operation of rinsing the dishes being the same as that of washing.

When it is desired to remove a cage of dishes away from the machine or into another place, a track, such as 27, is provided and is properly hooked or connected to the cross or tie bar 5 by means of the hook 28, the outer end of the track 27 being supported by the upright 29, which upright is so constructed that it will stand in an upright position.

When it is desired to elevate the tank 2 and tilt the same, the hook 19 is connected to the bail 21 and the shaft 10 rotated, at which time the tilting-cord 30 is connected to the winding-spool 12 and to the eye 31 by means of the hook 32. As the crank is rotated the tilting-cord 30 will be wound around the spool 12, which tilts the tank and will bring the same into the position shown in dotted lines, Fig. 4, which allows the water contained in the tank to be removed or run out, and for the purpose of allowing the tank to tilt the bail 21 is connected up midway between the bottom and top of the tank. For the purpose of providing guides for the tank as it is elevated the standards 3 are provided with the slots 33, which slots are formed of a length to allow the tank to be elevated the desired distance. To the tank 2 are attached the bail-connecting ears 34, and through said bail-connecting ears are passed lateral extensions 35, which extensions are held in the slots 33 and of course guide the tank 2.

The hinged extensions 22 and 23 are so arranged that they can be folded, as illustrated in dotted lines, Fig. 1, and held in that position by means of the hooks 36, which hooks are connected by suitable eyes 37, said eyes being connected to the uprights 3.

For the purpose of forming a guide for the tilting-cord 30 the grooved pulley 38 is employed and is held in proper position with reference to the spool 12 by means of the bracket-head 39.

It will be understood that a suitable carriage, such as 40, is to be placed upon the track 27 and said carriage provided with a hook 41, which hook is for the purpose of holding the cage by means of its bail, or, if desired, the tank may be moved by means of the track 27.

For the purpose of providing a means for removing the tank 2 onto the hinged extensions a notch 42 is formed, so that one of the bail extensions 35 can be detached from the slot of the upright 3, after which the extension upon the opposite side can be withdrawn, thereby releasing the tank from the uprights 3, at which time the tank 2 is free to be moved to any desired place.

The cleaner herein described and shown is especially designed for use in cleaning a large number of dishes at a single time, and hence provision is made for easily operating the heavy tanks and cages.

For the purpose of preventing the truck or trucks 26 from becoming accidentally detached from the hinged sections 22 and 23 the outer ends of the hinged sections are provided with the stop-bars 43 or their equivalents. The hinged extensions are provided with the eyes 44, which are for the purpose of receiving the hooks 36 when said hinged extensions are folded, as illustrated in dotted lines, Fig. 1. The object of folding the hinged extensions is to reduce the bulk of the machine for shipping and storage.

Having fully described our invention, what we claim as new, and desire to secure by Letters Patent, is—

1. The combination of a base, slotted standards connected thereto, tie-bars secured to the top or upper ends of the standards, a crank-shaft, an operating-rope connected thereto, a pulley-head provided with a hook, a roller carried by the cross-bars and an operating-lever, said operating-rope being connected to the operating-lever, a tank and a cage normally located within the tank, substantially as and for the purpose specified.

2. In a dish-cleaning machine a base, standards connected thereto, hinged extensions connected to the base, track-sections located upon the base and the hinged sections, a truck adapted to move upon the track-sections, a tank carried by the truck, a cage and means for imparting a reciprocating movement to the cage within the tank, substantially as and for the purpose specified.

3. In a dish-cleaning machine, a base, a tank having connected thereto a bail, ears provided with lateral extensions, standards secured to the base and provided with slots or guides, and means for elevating the tank, a cage and means for elevating the cage, substantially as and for the purpose specified.

4. In a dish-cleaning machine the combination of a base, standards connected thereto and provided with slots or ways, a tank pivoted to a bail with ears that are provided with extensions, said extensions being located in the slots or ways in the standards, a shaft having connected thereto an operating-rope, a spool mounted upon the shaft and having a tilting-cord connected thereto, and to the tank, substantially as and for the purpose specified.

5. In a dish-cleaning machine the combination of a base, standards connected thereto, tie-bars located at the top or upper ends of the standards, a shaft having connected thereto an operating-rope, an operating-lever having one end of the operating-rope connected thereto, a cage provided with a bail, a pulley-block carried by the operating-rope and means for holding the shaft against rotation by the downward pull of the operating-rope, substantially as and for the purpose specified.

6. In a dish-cleaning machine, a base, a tank adapted to hold a cage, a cage provided with a bail, standards connected to the base, cross or tie bars connected to the standards, a track detachably connected to one of the cross-bars, and the track provided with a traveling carriage, substantially as and for the purpose specified.

7. In a dish-cleaning machine, a base, standards connected thereto, hinged extensions connected to the base, track-sections located upon the base and the hinged sections, eyes connected to the hinged sections, and hooks connected to the standards, substantially as and for the purpose specified.

In testimony that we claim the above we have hereunto subscribed our names in the presence of two witnesses.

JAMES W. READ.
BERTON C. READ.

Witnesses:
W. H. WILER,
SPEERS MCCLARRAN.